United States Patent
Bose et al.

(10) Patent No.: US 7,392,366 B2
(45) Date of Patent: Jun. 24, 2008

(54) ADAPTIVE FETCH GATING IN MULTITHREADED PROCESSORS, FETCH CONTROL AND METHOD OF CONTROLLING FETCHES

(75) Inventors: Pradip Bose, Yorktown Heights, NY (US); Alper Buyuktosunoglu, White Plains, NY (US); Richard J. Eickemeyer, Rochester, MN (US); Lee E. Eisen, Round Rock, TX (US); Philip G. Emma, Danbury, CT (US); John B. Griswell, Austin, TX (US); Zhigang Hu, Ossining, NY (US); Hung Q. Le, Austin, TX (US); Douglas R. Logan, Austin, TX (US); Balaram Sinharoy, Poughkeepsie, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 11/228,781

(22) Filed: Sep. 16, 2005

(65) Prior Publication Data

US 2006/0101238 A1 May 11, 2006

Related U.S. Application Data

(60) Provisional application No. 60/610,990, filed on Sep. 17, 2004.

(51) Int. Cl.
*G06F 9/30* (2006.01)
*G06F 9/40* (2006.01)
*G06F 15/00* (2006.01)

(52) U.S. Cl. .................................. 712/204; 712/214
(58) Field of Classification Search ................. 712/206, 712/214, 204
See application file for complete search history.

(56) References Cited

U.S. PATENT DOCUMENTS 6,212,544 B1 * 4/2001 Borkenhagen et al. ...... 718/103
6,567,839 B1    5/2003 Borkenhagen et al.

OTHER PUBLICATIONS

Tullsen, Eggers, Emer, Levy, Lo & Stamm; Exploiting Choice: Instruction Fetch and Issue on an Implementable Simultaneous Multithreading Processor; May 1996; ACM Press; Proceedings of the 23rd annual international symposium on computer architecture; pp. 191-202.*

(Continued)

*Primary Examiner*—Eddie P Chan
*Assistant Examiner*—Corey S Faherty
(74) *Attorney, Agent, or Firm*—Law Office of Charles W. Peterson, Jr.; Louis J. Percello, Esq.; Brian P. Verminski, Esq.

(57) ABSTRACT

A multithreaded processor, fetch control for a multithreaded processor and a method of fetching in the multithreaded processor. Processor event and use (EU) signs are monitored for downstream pipeline conditions indicating pipeline execution thread states. Instruction cache fetches are skipped for any thread that is incapable of receiving fetched cache contents, e.g., because the thread is full or stalled. Also, consecutive fetches may be selected for the same thread, e.g., on a branch mis-predict. Thus, the processor avoids wasting power on unnecessary or place keeper fetches.

26 Claims, 5 Drawing Sheets

OTHER PUBLICATIONS

Yamamoto & Nemirovsky; Increasing Superscalar Performance Through Multistreaming; Jun. 1995; IFIP Working Group on Algol; Proceedings of the IFIP WG10.3 working conference on Parallel architectures and compilation techniques; pp. 49-58.*

Baniasadi, Moshovos; Instruction Flow-Based Front-end Throttling for Power-Aware High-Performance Processors; 2001; ACM Press; Proceedings of the 2001 international symposium on low power electronics and design; pp. 16-21.*

A. Buyuktosunoglu, D. Albonesi, T. Karkhanis and P. Bose, Energy efficient co-adaptive instruction fetch and issue, Proc. Int'l.Symp. on Computer Architecture (ISCA), Jun. 2003.

A. Buyuktosunoglu, P. Bose, D. Albonesi, S. Schuster, P. Cook, Tradeoffs in power-efficient issue queue design, Proc. ISLPED, Aug. 2002.

T. Karkhanis, J. E. Smith and P. Bose, Saving energy with just-in-time instruction delivery, Proc. Int'l. Symp. on Low Power Electronics and Design (ISLPED), Aug. 2002.

P. M. W. Knijnenburg, A. Ramirez, J. Larriba, M. Valero, Branch, Branch Classification for SMT Fetch Gating, Proc. MTEAC, 2002.

K. Luo, M. Franklin, S. S. Mukherjee, A. Sezne, Boosting SMT Performance by Speculation Control, Proc. Int'l. Parallel and Distributed Processing Simulation, (IPDPS), 2001.

Manne et al., Pipeline Gating: Speculation Control for Energy Reduction, Proc. 25th Int'l. Symp. on Computer Architecture (ISCA), 1998.

A. E. Moursy, D. H. Albonesi, Front-End Policies for Improved Issue Efficiency in SMT Processors, Proc. HPCA, 2003.

J. S. Seng, D. M. Tullsen, G. Z. N. Cai, Power-Sensitive Multithreaded Architecture, Proc. Int'l. Conf. on Computer Design (ICCD), 2000.

* cited by examiner

ADAPTIVE FETCH GATING IN MULTITHREADED PROCESSORS, FETCH CONTROL AND METHOD OF CONTROLLING FETCHES

CROSS REFERENCE TO RELATED APPLICATION

The present invention is a continuation of U.S. Provisional Patent Application Ser. No. 60/610,990, entitled "System And Method For Adaptive Fetch Gating" to Pradip Bose et al., filed Sep. 17, 2004 and is incorporated herein by reference.

BACKGROUND OF THE INVENTION

1. Field of the Invention

The present invention generally relates to the multithreaded processors and more particularly to reducing power consumption in a Simultaneous MultiThreaded (SMT) processor or microprocessor.

2. Background Description

Semiconductor technology and chip manufacturing advances have resulted in a steady increase of on-chip clock frequencies, the number of transistors on a single chip and the die size itself. Thus, not withstanding the decrease of chip supply voltage, chip power consumption has increased as well. Both at the chip and system levels cooling and packaging costs have escalated as a natural result of this increase in chip power. At the low end for small systems (e.g., handhelds, portable and mobile systems), where battery life is crucial, it is important to reduce net power consumption, without having performance degrade to unacceptable levels. Thus, the increase in microprocessor power consumption has become a major stumbling block for future performance gains. Pipelining is one approach to maximizing processor performance.

A scalar processor fetches and issues/executes one instruction at a time. Each such instruction operates on scalar data operands. Each such operand is a single or atomic data value or number. Pipelining within a scalar processor introduces what is known as concurrency, i.e., processing multiple instructions at difference pipeline stages in a given clock cycle, while preserving the single-issue paradigm.

A superscalar processor can fetch, issue and execute multiple instructions in a given machine cycle, each in a different execution path or thread. Each instruction fetch, issue and execute path is usually pipelined for further, parallel concurrency. Examples of superscalar processors include the Power/PowerPC processors from IBM Corporation, the Pentium processor family from Intel Corporation, the Ultrasparc processors from Sun Microsystems and the Alpha processor and PA-RISC processors from Hewlett Packard Company (HP). Front-end instruction delivery (fetch and dispatch/issue) accounts for a significant fraction of the energy consumed in a typical state of the art dynamic superscalar processor. For high-performance processors, such as IBM's POWER4™, the processor consumes a significant portion of chip power in the instruction cache (ICACHE) during normal access and fetch processes. Of course, when the fetch process stalls, temporarily (e.g., due to instruction buffer fill-up, or cache misses), that portion of chip power falls off dramatically, provided the fetch process is stalled also.

Unfortunately, other factors (e.g., chip testability, real estate, yield) tend to force a trade of power for control simplification. So, in prior generation power-unaware designs, one may commonly find processors architected to routinely access the ICACHE on each cycle, even when the fetched results may be discarded, e.g., due to stall conditions. Buffers and queues in such processor designs have fixed sizes, and depending on the implementation, consume power at a fixed rate, irrespective of actual cache utilization or workload demand. For example, for a typical state of the art instruction fetch unit (IFU) in a typical state of the art eight-issue superscalar processor, executing a class of commercial benchmark applications, only about 27% of the cycles result in useful fetch activity. Similarly, idle and stalled resources of a front-end instruction decode unit (IDU) pipe wastes significant power. Further, this front-end starvation keeps back-end execute pipes even more underutilized, which impacts processor throughput.

By contrast, in what is known as an energy-aware design, the fetch and/or issue stages are architected to be adaptive, to accommodate workload demand variations. These energy-aware designs adjusts the fetch and/or issue resources to save power without appreciable performance loss. For example, Buyuktosunoglu et al. (Buyuktosunoglu I), "Energy efficient co-adaptive instruction fetch and issue," *Proc. Int'l.Symp. on Computer Architecture (ISCA)*, June 2003 and Buyuktosunoglu et al. (Buyuktosunoglu II), "Tradeoffs in power-efficient issue queue design," *Proc. ISLPED*, August 2002, both discuss such energy aware designs. In particular, Buyuktosunoglu I and II focus on reconfiguring the size of issue queues, in conjunction (optionally) with an adjustable instruction fetch rate. In another example, Manne et al., "Pipeline Gating: Speculation Control for Energy Reduction," *Proc. 25$^{th}$ Int'l. Symp. on Computer Architecture (ISCA)*, 1998, teaches using the processor branch mis-prediction rate in the instruction fetch to effectively control the fetch rate for power and efficiency. Unfortunately, monitoring the branch prediction accuracy requires additional, significant and complex on-chip hardware that consumes both valuable chip area and power.

This problem is exacerbated in multithreaded machines, where multiple instruction threads may, or may not be in the pipeline at any one time. For example, Karkhanis et. al, "Saving energy with just-in-time instruction delivery," *Proc. Int'l. Symp. on Low Power Electronics and Design (ISLPED)*, August 2002, teach controlling instruction fetch rate by keeping a count of valid, downstream instructions. Both U.S. Pat. No. 6,212,544 to Borkenhagen et al. (Borkenhagen I), entitled "Altering thread priorities in a multithreaded processors," and U.S. Pat. No. 6,567,839 to Borkenhagen et al. (Borkenhagen II), "Thread switch control in a multithreaded processor system," both assigned to the assignee of the present invention and incorporated herein by reference, teach designing efficient thread scheduling control for boosting performance and/or reducing power in multithreaded processors. In yet another example, Seng et al. "Power-Sensitive Multithreaded Architecture," *Proc. Int'l. Conf. on Computer Design (ICCD)* 2000, teaches an energy-aware multithreading design.

State of the art commercial microprocessors (e.g. Intel's Netburs™ Pentiu™ IV or IBM's POWER5™) use a mode of multithreading that is commonly referred to as Simultaneous MultiThreading (SMT). In each processor cycle, a SMT processors simultaneously fetches instructions and/or dispatches for different threads that populate the back-end execution resources. Fetch gating in an SMT processor refers to conditionally blocking the instruction fetch process. Thread prioritization involves assigning priorities in the order of fetching instructions from a mix of different workloads in a multithreaded processor. Some of the above energy-aware design approaches have been applied to SMT. For example, Luo et al. "Boosting SMT Performance by Speculation Control," *Proc. Int'l. Parallel and Distributed Processing Simulation, (IPDPS)*, 2001, teaches improving performance in energy-aware SMT processor design. Moursy et al. "Front-End Policies for Improved Issue Efficiency in SMT Processors," *Proc. HPCA* 2003, focuses on reducing the average power consumption in SMT processors by sacrificing some performance. By contrast, Knijnenburg et al. "Branch Classification for SMT Fetch Gating," *Proc. MTEAC* 2002 focuses on increasing performance without regard to complexity. These energy aware approaches require complex variable instruction fetch rate mechanisms and control signals necessitating significant additional logic hardware. The additional logic hardware dynamically calculates complex utilization, prediction rates and/or flow rate metrics within the processor or system. However, the verification logic of such control algorithms adds overhead in complexity, area and power, that is not amenable to a low cost, easy implementation for high performance chip designs. This overhead just adds to both escalating development costs and spiraling power dissipation costs.

Unfortunately, many of these approaches have achieved improved performance only at the cost of increased processor power consumption. Others have reduced power consumption (or at least net energy usage) by accepting significantly degraded performance. Still others have accepted complex variable instruction fetch rate mechanisms that necessitate significant additional logic hardware.

Thus, there is a need for a processor architecture that minimizes power consumption without impairing processor performance and without requiring significant control logic overhead or power.

SUMMARY OF THE INVENTION

It is therefore a purpose of the invention to minimize processor power consumption;

It is another purpose of the invention to minimize Simultaneous MultiThreaded (SMT) processor power consumption;

It is yet another purpose of the invention to minimize SMT processor power consumption without incurring significant performance or area overhead.

The present invention is related to multithreaded processor, fetch control for a multithreaded processor and a method of fetching in the multithreaded processor. Processor event and use (EU) signals are monitored for downstream pipeline conditions indicating pipeline execution thread states. Instruction cache fetches are skipped for any thread that is incapable of receiving fetched cache contents, e.g., because the thread is full or stalled. Also, consecutive fetches may be selected for the same thread, e.g., on a branch mis-predict. Thus, the processor avoids wasting power on unnecessary or place keeper fetches.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
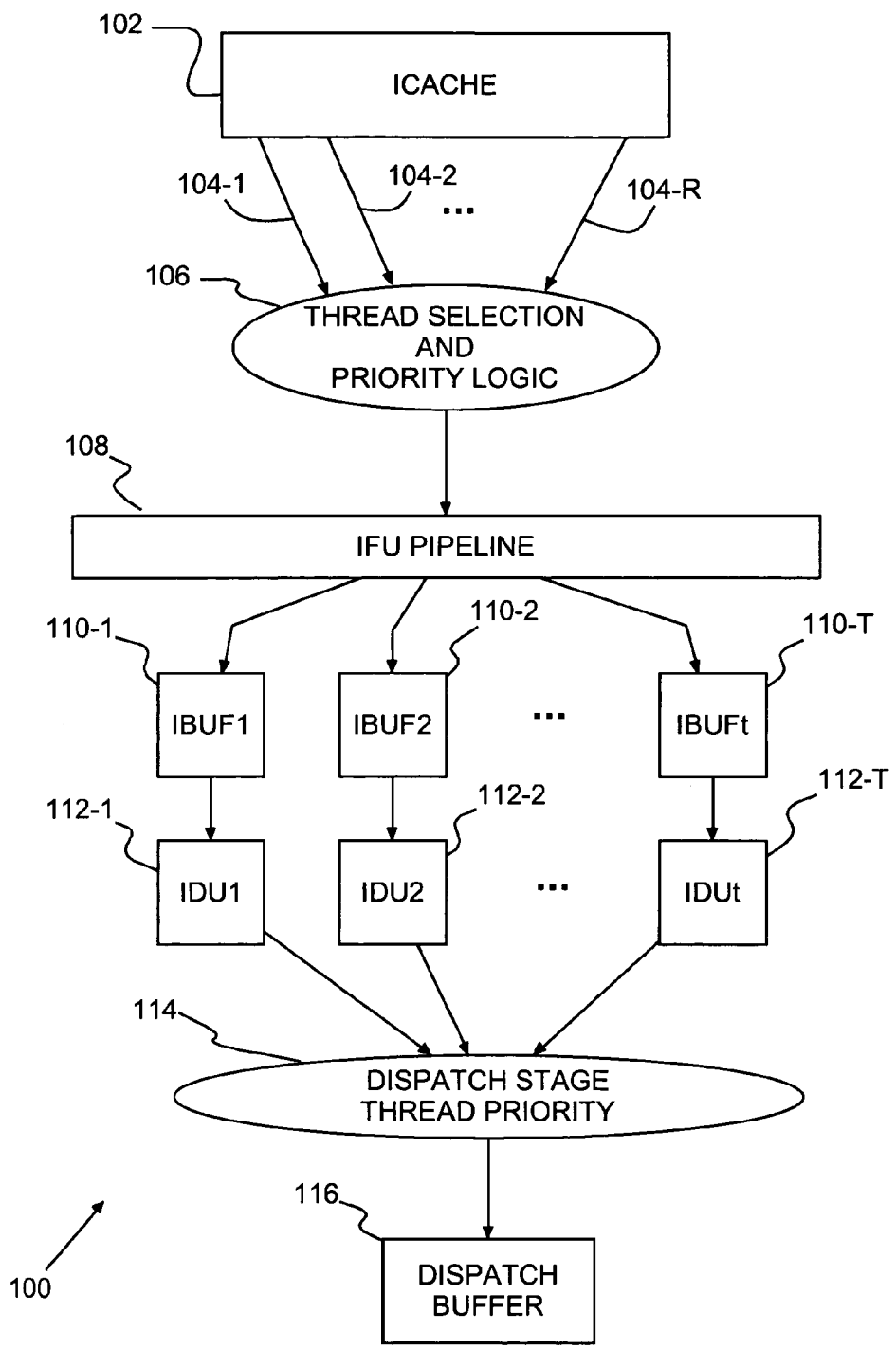
FIG. 1 shows a general example of Simultaneous Multi-Threaded (SMT) architecture wherein the front end of a state of the art SMT processor is optimized for minimum power consumption without impacting performance or area according to a preferred embodiment of the present invention.

Turning now to the drawings, and more particularly, FIG. 1 shows a general example of Simultaneous MultiThreaded (SMT) architecture wherein the front end of a state of the art SMT processor 100 is optimized for minimum power consumption without impacting performance or area, according to a preferred embodiment of the present invention. The SMT processor 100, which may be a single chip or multi-chip microprocessor, includes an instruction cache (ICACHE) 102 with a number of tasks or applications in cache contents from which to select/fetch. The ICACHE 102 provides cached instructions for R threads that originate from one of R ports 104-1, 104-2, -104-R. Preferred embodiment priority thread selection logic 106 selectively fetches and passes the contents of each of ports 104-1, 104-2, -104-R to an Instruction Fetch Unit (IFU) pipeline 108. Each of the R ports 104-1, 104-2, -104-R has a fixed maximum fetch bandwidth to the IFU pipeline 108 of a number of instructions per cycle. Thus, the preferred embodiment priority thread selection logic 106 may pass the contents from each port 104-1, 104-2, -104-R at a rate up to that maximum with the overall bandwidth being R times that maximum.

The IFU 108 passes instructions into T front-end Instruction BUFfers (IBUF), 110-1, 110-2,-110-T, one for each supported machine execution thread. The preferred embodiment priority thread selection logic 106 also receives Event and Use (EU) signals or flags to control fetch and thread selection for the fetch process, determine target instruction buffer threads in instruction buffers 110-1, 110-2, 110-T, as well as order within the threads and the number of instructions fetched, if any, for a given thread. Instructions in each instruction buffer 110-1, 110-2,-110-T pass through a corresponding decode and dispatch unit, 112-1, 112-2,-112-T and, subsequently, emerge under control of dispatch-thread priority logic 114. The dispatch-thread priority logic 114 selects instructions from various different threads and multiplexes the selected instructions as an input to a common dispatch buffer 116. This dispatch buffer 116 issues instructions into the back-end execution pipes (not shown in this example).

It may be shown that, absent preferred embodiment fetch control, within an average processor cycle window, the front-end fetch engine of this SMT processor 100 example accesses the ICACHE 102 much more frequently than necessary and uses the instruction buffers, 110-1, 110-2, -110-T, much more than necessary. Thus, the preferred embodiment fetch control balances the power-performance of the front-end fetch engine of this SMT processor 100 for dramatically improved efficiency.

Figure 2:
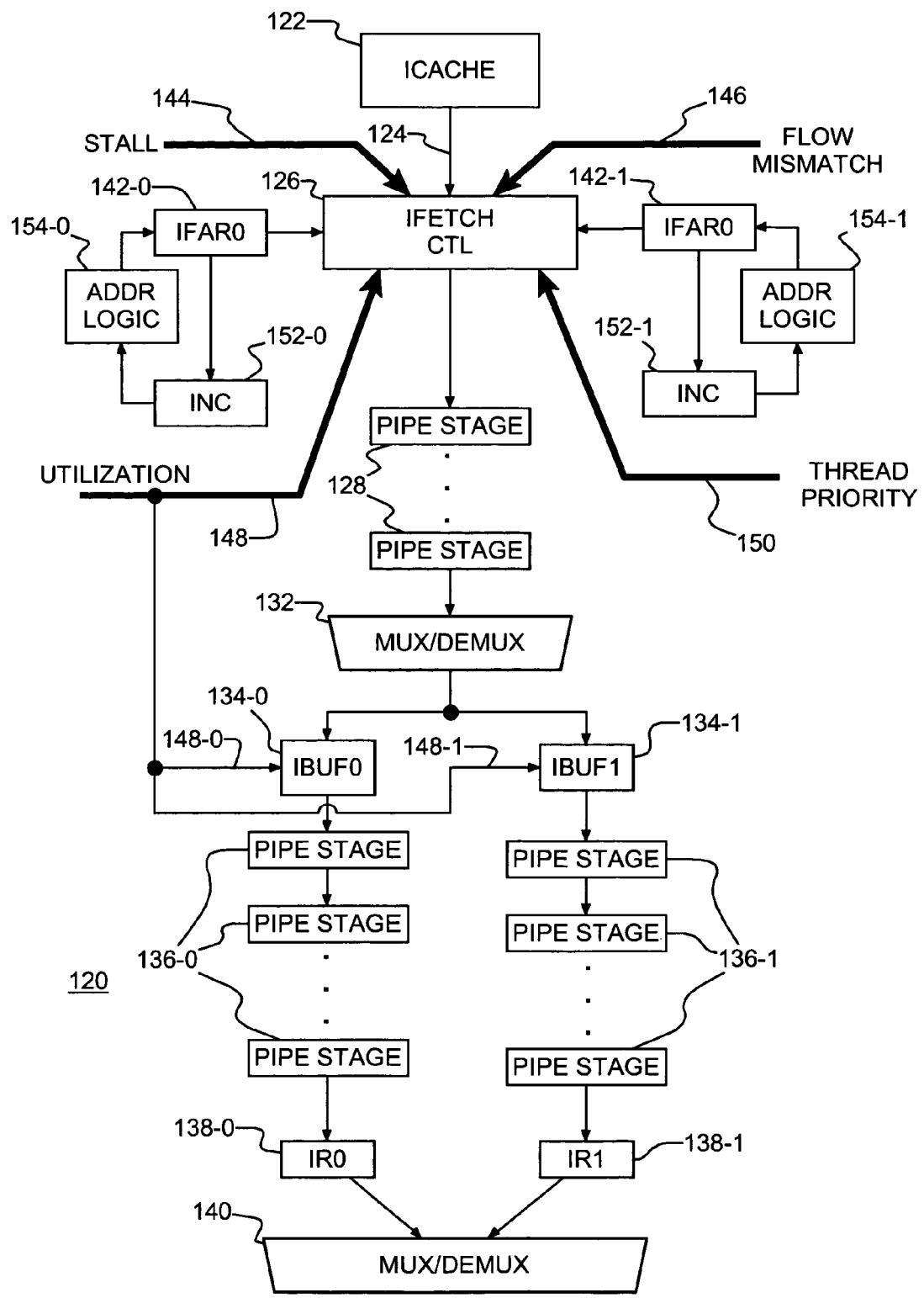
FIG. 2 shows a block diagram of a more specific example of a preferred embodiment SMT processor in more detail that supports two threads in this example.

FIG. 2 shows a block diagram of a more specific example of a preferred embodiment SMT processor 120 in more detail, supporting two threads in this example. The ICACHE 122 has a single read port 124 to preferred fetch control 126. The preferred fetch control 126 selectively fetches instructions and forwards fetched instructions to front end pipeline stages 128. So, instructions exiting the front end pipe line stages 128 pass through multiplexor/demultiplexor (mux/demux) 132 and enter an Instruction BUFfer (IBUF) in one of two threads, 134-0, 134-1 of this example. Each thread passes through a number of buffer pipeline stages 136-0, 136-1, eventually emerging from an Instruction Register (IR) 138-0, 138-1. A multiplexer 140, selects a mix of instructions from the contents of the instruction registers 138-0, 138-1 to back end processor logic (not shown), e.g., to a dispatch group for back end execution. An Instruction Fetch Address Register (IFAR) 142-0, 142-1 addresses each fetched instruction.

Thread monitor and control flags 144, 146, 148, 150 determine in each clock cycle whether the preferred fetch control 126 forwards an instruction from the ICACHE 122, that is identified by one of the instruction fetch address registers 142-0, 142-1. In this example, the thread monitor and control flags include stall event flags (e.g., branch mis-predicts, cache misses, etc.) 144, flow rate mismatch flags 146, utilization flags 148 and, optionally, thread priority flags 150. The utilization flags 148 may include individual instruction buffer high water mark controls 148-0, 148-1 that also operate to stall corresponding instruction buffers 134-0, 134-1, whenever a respective thread pipeline is full to its respective high water mark. Although the utilization flags 148-0 and 148-1 are indicated herein as two flags, each having to do with the instruction buffers 134-0, 134-1, this is for example only. Multiple utilization flags may be included as downstream utlization markers. For example, a high watermark may be provided for various other downstream queues, e.g., in the execution back-end of the machine, that may provide additional or alternate inputs to the preferred fetch control 126.

However, for any particular cycle in the example of FIG. 2, when a fetch is enabled, the address in the instruction fetch address register, 142-0, 142-1 may simply be incremented from the previous cycle, e.g., by an incrementer 152-0, 152-1. Alternately, the address may be loaded from next fetch address logic 154-0, 154-1, e.g., in response to a branch. So, for example, the next address may depend upon an interrupt, a branch instruction or Branch History Table/Branch Target Buffer (BHT/BTB) contents. Further, the next fetch address logic 154-0, 154-1 logic may be implemented using any suitable such fetch address logic to generate the next cache address as may be appropriate for the particular application.

The preferred fetch control 126 infers thread stall states, cycle-by-cycle, from the stall flags 144 indicating selected stall events, e.g., branch mis-prediction, cache miss, and dispatch stall. These stall event flags 144 are often routinely tracked on-chip in state of the art processors, e.g., using performance counters, or as part of other book-keeping and stall management. However, in accordance with a preferred embodiment of the present invention, the stall flags 144 are invoked as override conditions to prevent/enable fetch-gating for a stalled thread, or to redirect fetches for another thread. Also, when a branch mis-prediction occurs in a given thread, the thread contents are invalid. The preferred fetch control 126 gives that thread priority and allows uninhibited fetches at full bandwidth to fill up pipeline slots in the thread that are vacated by flushed instructions.

Downstream utilization state flags 148 provide a set of high watermark indicators that the preferred fetch control 126 monitors for developing path criticalities. Thus, each high watermark flag 148, when asserted, indicates that a particular queue or buffer resource is almost full. Depending on whether a thread-specific resource or a shared resource is filling, a thread selection and prioritization policy may be defined in the preferred fetch control 126 and dynamically adjusted to indicate when any particular resources are at or near capacity. Upon such an occurrence, the preferred fetch control 126 may invoke fetch-gating based on the falloff of downstream demand to save energy whenever possible.

Figure 3A:
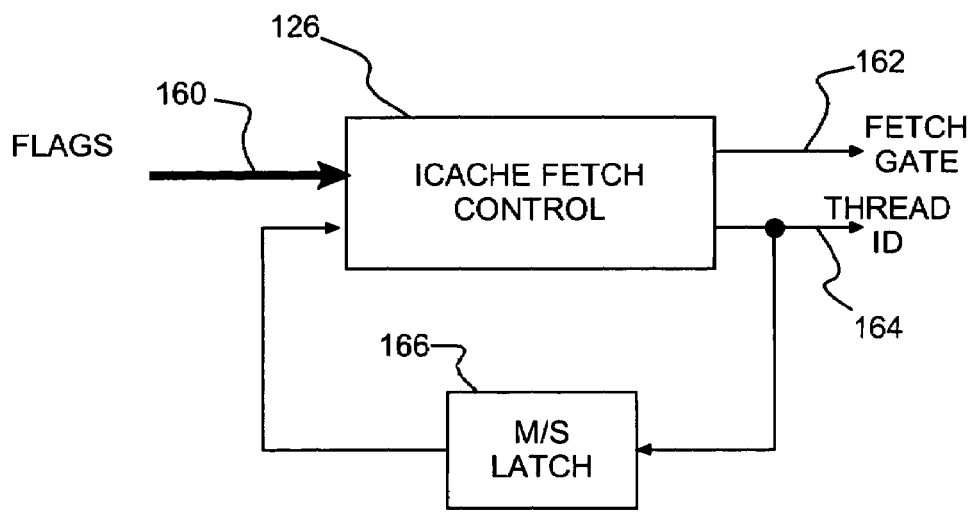
FIGS. 3A-B show an example of the preferred fetch control, which determines on each cycle, whether a fetch from the ICACHE occurs, based on the current state of thread monitor and control flags.
Figure 3B:
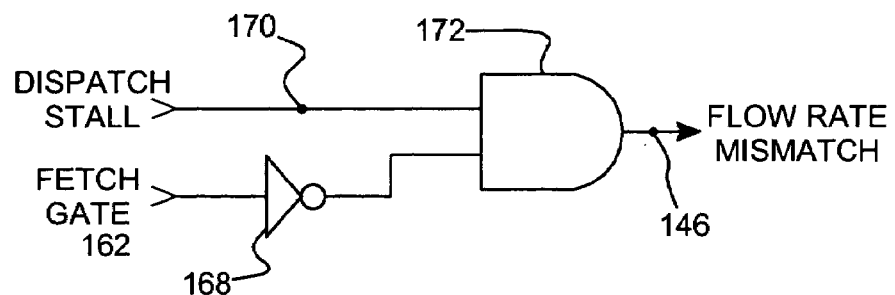

FIGS. 3A-B show examples of inputs and output control to the preferred fetch control 126 for determining on each cycle, whether a fetch from the ICACHE 122 occurs based on the current state of thread monitor and control flags 144, 146, 148, 150, collectively, 160 in this example. Preferably, the fetch control logic 126, is a simple finite state machine, that monitors a small subset of processor utilization indicators, e.g., stall state and last thread identifier. Thus, thread monitor and control flags 160 may include, for example, a branch mis-prediction indicator, a cache miss indicator, an execution pipeline stall indicator, a dependence-related dispatch stall indicator, a resource-conflict stall indicator, and a pipeline flush-and-replay stall indicator. The fetch control logic 126 may include a finite state controller with two outputs, a fetch_gate 162 and a next_thread_id indicator 164. The fetch_gate 162 is a Boolean flag that is asserted whenever gating the instruction fetch is deemed to be desirable. The next_thread_id indicator 164 points to the thread for fetching in the next cycle. A miss/stall latch 166 holds the last fetch identification and latches the current thread fetch identification for facilitating in determining in each fetch cycle, the next thread fetch identification. A fetch gate output enables gating the contents of the ICACHE (122 in FIG. 2) as selected by the corresponding fetch address register (142-0, 142-1). The inverse of the fetch gate 162, inverted by inverter 168 in this example, combines with a dispatch stall signal 170 in an AND gate 172 to provide a flow rate indicator as a flow mismatch flag 146 in FIG. 2.

Figure 4A:
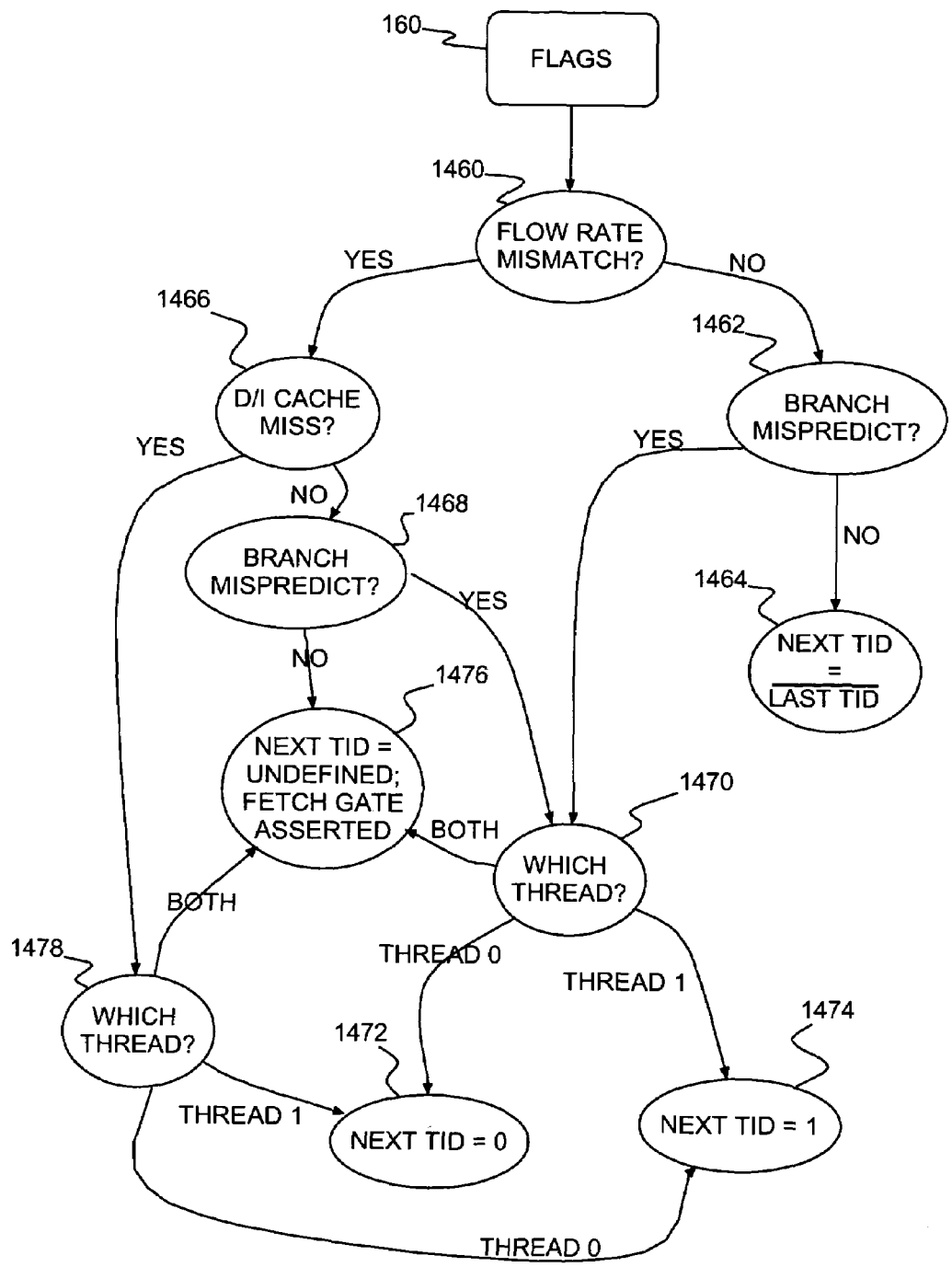
FIGS. 4A-B show examples of a state diagrams for the preferred embodiment fetch control from thread monitor and control flags.
Figure 4B:
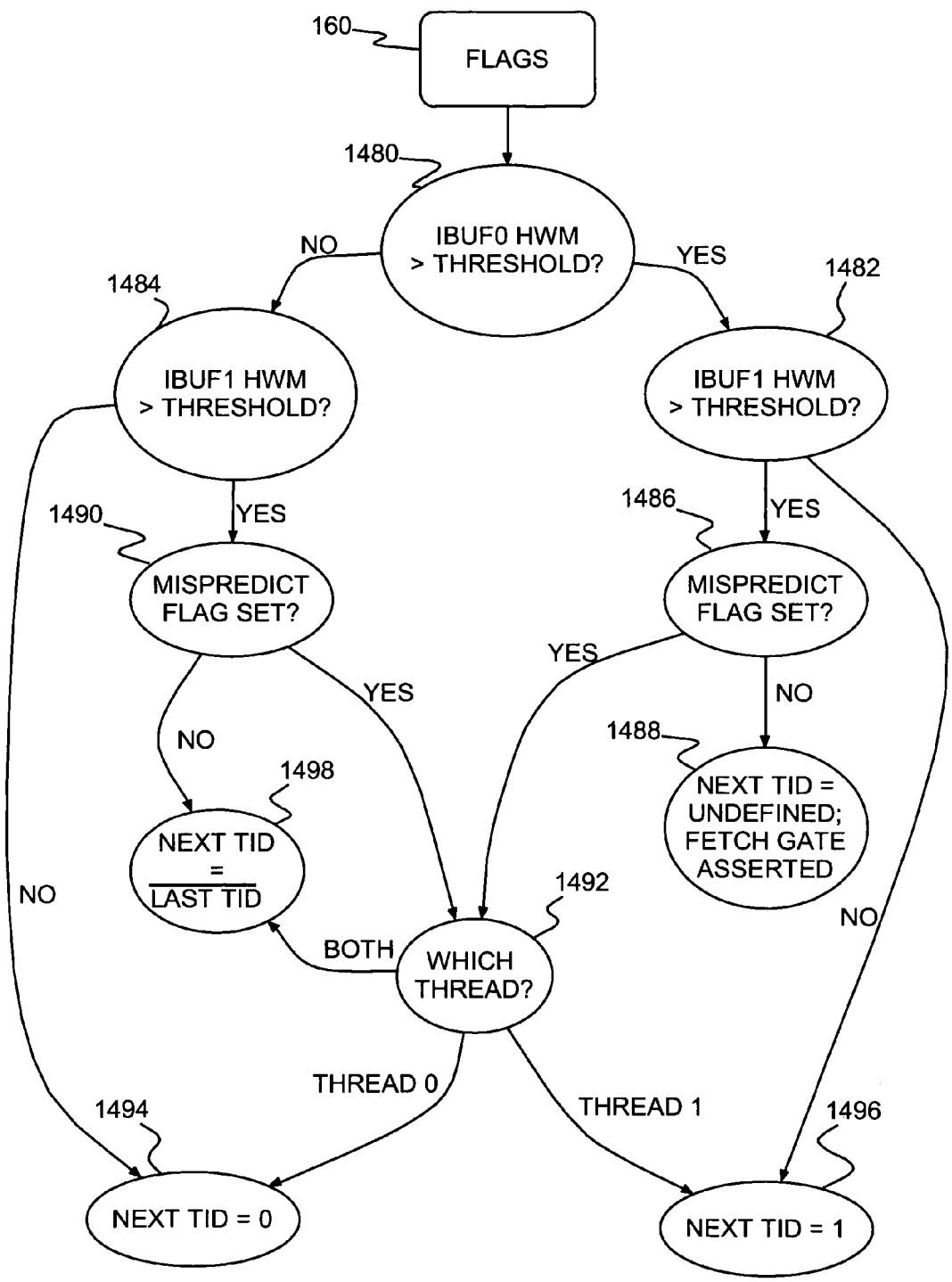

FIGS. 4A-B show examples of a state diagrams for the preferred embodiment fetch control 126 of FIGS. 2 and 3A from thread monitor and control flags 160. In step 1460 of FIG. 4A, the flags 160 are checked for an indication of a flow rate mismatch. If a flow rate mismatch is not indicated, then in 1462, the flags 160 are checked for an indication that a branch mis-prediction has occurred. If the flags 160 do not indicate a branch mis-prediction either, then in 1464 the next ICACHE fetch is for a thread that is different than the last. However, if it is determined in 1460 that a flow rate mismatch has occurred, then in 1466 the flags 160 are checked for a Data/Instruction (D/I) cache miss. If a D/I cache miss has not occurred, then in 1468, the flags 160 are checked for an indication that a branch mis-prediction has occurred. If the flags 160 indicate that a branch mis-prediction has occurred in either 1462 or 1468, then in 1470, a determination is made of which thread, e.g., thread 0, thread 1, or both in this example. If in 1470 the mis-prediction indication is: thread 0, then in 1472, the next thread ID is set to indicate thread 0; thread 1, then in 1474, the next thread ID is set to indicate thread 1; otherwise, both threads are indicated and in 1476, and the next thread ID is set to indicate that it is undefined. Also, if branch mis-prediction is determined not to have occurred in 1468, then, the next thread ID is undefined in 1476. Since the next thread ID is undefined in 1476, the fetch gate should be enabled, and nothing should be fetched from either thread in the next cycle. If it is determined that a D/I cache miss has occurred in 1466, then in 1478, a determination is made of which thread, e.g., thread 0, thread 1, or both in this example. A determination of either thread 0, or thread 1, results in an opposite indication of determination 1470.

Similarly, FIG. 4B, the flags 160 are checked for an indication of that the high water mark for one of the instruction buffers is above a selected threshold. So, for the example of FIG. 2, in 1480, the high water mark is checked for instruction buffer 0. Depending on the results of that check, the high water mark is checked for instruction buffer 1 in 1482 if the high water mark for instruction buffer 0 is at or above that threshold, or in 1484 if the high water mark for instruction buffer 0 is below the threshold. If in 1482, the high water mark for instruction buffer 1 is below the threshold; then, in 1486 the flags 160 are checked for an indication that a branch mis-prediction has occurred. If a branch mis-prediction has not occurred, then in 1488 the next thread ID is set to indicate that it is undefined; and, simultaneously, the previous thread ID is held (e.g., in the miss/stall latch 162 of FIG. 3A) and the fetch gate is asserted. Similarly, in 1484 if the high water mark for instruction buffer 1 is at or above the threshold; then, in 1490 the flags 160 are checked for an indication that a branch mis-prediction has occurred. If in either 1486 or 1490, a branch mis-prediction is found to have occurred; then in 1492, a determination is made of which branch, again, thread 0, thread 1, or both in this example. If in 1492 the mis-prediction indication is: thread 0, then in 1494, the next thread ID is set to indicate thread 0; thread 1, then in 1496, the next thread ID is set to indicate thread 1; otherwise, both threads are indicated and in 1498 and the next ICACHE fetch is for a thread that is different than the last. If in 1482, the high water mark for instruction buffer 1 was found at or above the threshold, the next thread ID is set to indicate thread 1 in 1496. If in 1484, the high water mark for instruction buffer 1 was found below the threshold, the next thread ID is set to indicate thread 0 in 1494. Finally, if a branch mis-prediction is found to have occurred in 1490; then, the next ICACHE fetch is for a thread that is different than the last in 1496. Thus, using fetch control according to the present invention provides simple, effective adaptive fetch-gating for front-end thread selection and priority logic for significant performance gain, and with simultaneous front-end power reduction.

Advantageously, the thread monitor and control flags 144, 146, 148, 150 of FIG. 2 provide a simple indication of a processor state that derive cache gating controls to prevent unnecessary or superfluous instruction cache fetches or accesses. Accordingly, the preferred embodiment adaptive fetch-gating infers gating control from a typical set of (normally found in state of the art processor architectures) queue markers and event flags, and/or flags that are added or supplemented with insignificant area and timing overhead. Further, the present invention has application to SMT processors, generally, where adaptive fetch gating may be combined naturally with an implicit set of power-aware thread prioritization heuristics. For single-threaded processing, application of the invention naturally reduces to simple, adaptive fetch gating. Additionally, the preferred fetch gating has application on a cycle-by-cycle basis to determining whether each fetch should proceed, and if so, from which of a number of available threads. In yet another advantage, application of the invention to a typical state of the art processors significantly improves processor throughput performance, while reducing the number of actual cache accesses and, therefore, dramatically reducing energy consumption. The energy consumption reduction from application of the present invention may far exceed the reduction in execution time, thereby providing an overall average power dissipation reduction as well.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A multithreaded processor comprising:
    an instruction cache with a plurality of cache locations;
    a thread selection and priority circuit configured to monitor processor flags and selectively retrieve contents of each of said plurality of cache locations, said instruction thread selection and priority circuit comprising:
        means for generating a fetch gate signal from thread monitor and control flags,
        means for combining said fetch gate with a dispatch stall signal and providing a flow rate indicator responsive to said combination, said flow rate indicator indicating flow rate mismatch in said pipeline,
        means for determining Data/Instruction (D/I) cache misses, responsive to said flow rate mismatch,
        means for determining a branch mis-prediction responsive to said processor flags,
        means for determining a next thread responsive to said means for flow rate mismatch determination and said means for D/I cache miss determination, and
        means for indicating a next thread;
    an instruction fetch unit pipeline configured to receive the selectively retrieved contents from said thread selection and priority circuit; and
    a plurality of instruction buffer threads, wherein each of the selectively retrieved contents are passed to one of the instruction buffer threads through said instruction fetch unit pipeline, the thread selection and priority circuit being further configured to retrieve contents only for threads indicated by the processor flags as being capable of receiving the selectively retrieved contents.

2. A multithreaded processor as in claim 1, wherein said processor flags include pipeline stall flags, flow mismatch flags, and utilization flags.

3. A multithreaded processor as in claim 2, wherein said processor flags further include thread priority flags.

4. A multithreaded processor as in claim 1, wherein said thread selection and priority circuit comprises an instruction cache fetch control circuit receiving said processor flags and determining whether contents are fetched from said instruction cache and further selecting instruction cache contents being fetched.

5. A multithreaded processor as in claim 4, wherein said instruction cache fetch control circuit is a state machine.

6. A multithreaded processor as in claim 5, wherein said means for indicating a next thread comprises:
    a fetch address register indicating a next cache location, contents being selected responsive to said fetch address register and retrieved responsive to said fetch gate signal.

7. A multithreaded processor as in claim 5, wherein said state machine further comprises:
    means for determining whether each thread is at or above a high water mark;
    means for determining a mis-prediction responsive to said processor flags;

means for determining a next thread responsive to said means for determining a mis-prediction; and means for indicating a next thread.

8. A multithreaded processor as in claim 4, wherein said processor flags include said thread monitor and control flags.

9. A multithreaded processor as in claim 8, wherein said thread monitor and control flags include stall flags, said stall flags including said dispatch stall signal, a branch mis-prediction signal and a cache miss signal.

10. A multithreaded processor as in claim 1, wherein said multithreaded processor is a Simultaneous MultiThreaded (SMT) processor.

11. An instruction fetch controller connectable between an instruction cache and a plurality of instruction buffers, said instruction fetch controller comprising:

one or more inputs, each connected to an instruction cache port, each input receiving instructions from one or more threads stored in respective instruction cache banks;

one or more instruction outputs, each selectively providing one or more fetched instructions to a corresponding instruction buffer;

one or more control inputs providing receiving event and use (EU) signals, said EU signals including thread monitor and control flags;

means for generating a fetch gate signal from said thread monitor and control flags;

means for combining said fetch gate with a dispatch stall signal and providing a flow rate indicator responsive to said combination, said flow rate indicator indicating flow rate mismatch in said pipeline;

means for determining Data/Instruction (D/I) cache misses, responsive to said flow rate mismatch;

means for determining a branch mis-prediction responsive to said EU flags;

means for determining a next thread responsive to said means for flow rate mismatch determination and said means for D/I cache miss determination;

means for indicating a next thread; and means for selecting in any clock cycle responsive to said EU signals whether an instruction is fetched from the instruction cache.

12. An instruction fetch controller as in claim 11, where the fetch selection priority is responsive to said EU signals and the instruction fetch controller selects which instructions are fetched in each clock cycle responsive to said EU signals whenever instructions are fetched.

13. An instruction fetch controller as in claim 11, where the EU signals are selected from the group comprising: a signal indicating level of a queue, a stall event indicator, a thread priority indicator, an information flow rate indicator, a status flag, a pipeline stall condition indicator, a logical input indicator, a function input indicator, statistical indication signal, a historical state signal, and a state signal.

14. An instruction fetch controller as in claim 13, wherein the stall event indicator is selected from the group comprising: a branch mis-prediction indicator, a cache miss indicator, an execution pipeline stall indicator, a dependence-related dispatch stall indicator, a resource-conflict stall indicator, and a pipeline flush-and-replay stall indicator.

15. An instruction fetch controller as in claim 13, wherein the signal indicating level of the queue is a high watermark indicator for a buffer selected from the group comprising: an instruction fetch buffer, a load buffer, a store buffer, and an issue buffer.

16. An instruction fetch controller as in claim 11, wherein one or more of the EU signals are dispatch stage thread priority signals.

17. An instruction fetch controller as in claim 16, wherein the dispatch stage thread priority signals are asserted by software.

18. An instruction fetch controller as in claim 17, wherein the dispatch stage thread priority signals are hardware generated signals.

19. An instruction fetch controller as in claim 16, wherein the dispatch stage thread priority signals indicate an encoding order for considering threads in selecting cache contents and dispatching selected contents for execution in a given cycle.

20. A Simultaneous MultiThreaded (SMT) processor comprising:

an instruction cache with a plurality of cache locations;

an instruction fetch unit pipeline configured to receive selectively retrieved cache contents;

a plurality of instruction buffers, each selectively receiving data and instructions from said instruction fetch unit pipeline, wherein said instruction fetch unit pipeline is between said instruction cache and said plurality of instruction buffers, cache contents received by each of said plurality of instruction buffers passing through said instruction fetch unit pipeline to a respective instruction buffer;

an plurality of instruction buffer threads, each of said plurality of instruction buffer threads traversing one of said plurality of instruction buffers; and a thread selection and priority circuit monitoring event and use (EU) flag signals for an indication of ones of said plurality of instruction buffers being capable of receiving retrieved cache contents, said thread selection and priority circuit selecting cache content locations being fetched and retrieving said cache contents from selected said cache content locations for a thread traversing an indicated one, said instruction thread selection and priority circuit comprising:

means for generating a fetch gate signal from thread monitor and control flags, means for combining said fetch gate with a dispatch stall signal and providing a flow rate indicator responsive to said combination, said flow rate indicator indicating flow rate mismatch in said pipeline, means for determining Data/Instruction (D/I) cache misses, responsive to said flow rate mismatch, means for determining a branch mis-prediction responsive to said EU flags, means for determining a next thread responsive to said means for flow rate mismatch determination and said means for D/I cache miss determination, and means for indicating a next thread.

21. A SMT processor as in claim 20, wherein said thread selection and priority circuit comprises an instruction cache fetch control circuit receiving said EU flags and determining whether contents are fetched from said instruction cache and further selecting instruction said cache content locations.

22. A SMT processor as in claim 21, wherein said instruction cache fetch control circuit is a state machine and said means for indicating a next thread comprises:

a fetch address register indicating a next cache location, contents being selected responsive to said fetch address register and retrieved responsive to said fetch gate signal.

23. A SMT processor as in claim 21, wherein said instruction cache fetch control circuit is a state machine further comprising:
- means for determining whether each thread is at or above a high water mark;
- means for determining a mis-prediction responsive to said EU flags;
- means for determining a next thread responsive to said means for determining a mis-prediction; and
- means for indicating a next thread.

24. A SMT processor as in claim 21, wherein said EU flags include said thread monitor and control flags.

25. A SMT processor as in claim 24, wherein said thread monitor and control flags include stall flags, said stall flags including said dispatch stall signal, a branch mis-prediction signal and a cache miss signal.

26. A SMT processor as in claim 21, wherein said EU flags include pipeline stall flags, flow mismatch flags, utilization flags and thread priority flags.

* * * * *